United States Patent [19]

Hodgson

[11] Patent Number: 4,747,465

[45] Date of Patent: May 31, 1988

[54] VEHICLE SECURITY DEVICE

[76] Inventor: George Hodgson, Rough Close Cottage, 2 Tanners Ln., Berkswell, Coventry, England

[21] Appl. No.: 3,484

[22] Filed: Jan. 15, 1987

[51] Int. Cl.4 .......................... B60R 25/00; B62H 5/00
[52] U.S. Cl. ........................................ 180/287; 70/200
[58] Field of Search .................. 180/287; 70/237, 199, 70/200, 212, 203

[56] References Cited

U.S. PATENT DOCUMENTS

| 1,263,731 | 4/1918 | Baker | 70/200 |
| 1,272,192 | 7/1918 | Bell | 70/203 |
| 1,398,122 | 11/1921 | Bender | 70/200 |
| 1,566,885 | 12/1925 | Laska | 70/200 |
| 4,632,209 | 12/1986 | Russell | 180/287 |
| 4,660,878 | 4/1987 | Neverson | 180/287 |

Primary Examiner—Richard A. Bertsch
Attorney, Agent, or Firm—Gifford, Groh, VanOphem, Sheridan, Sprinkle and Dolgorukov

[57] ABSTRACT

A vehicle security device is arranged to prevent unauthorized use of the vehicle by preventing access to the vehicle operating pedals. The device includes a pivoted covering plate which pivots between an inoperative and operative position about a hinge. The plate is held in the operative position by a stay which is locked in position by a lock.

4 Claims, 1 Drawing Sheet

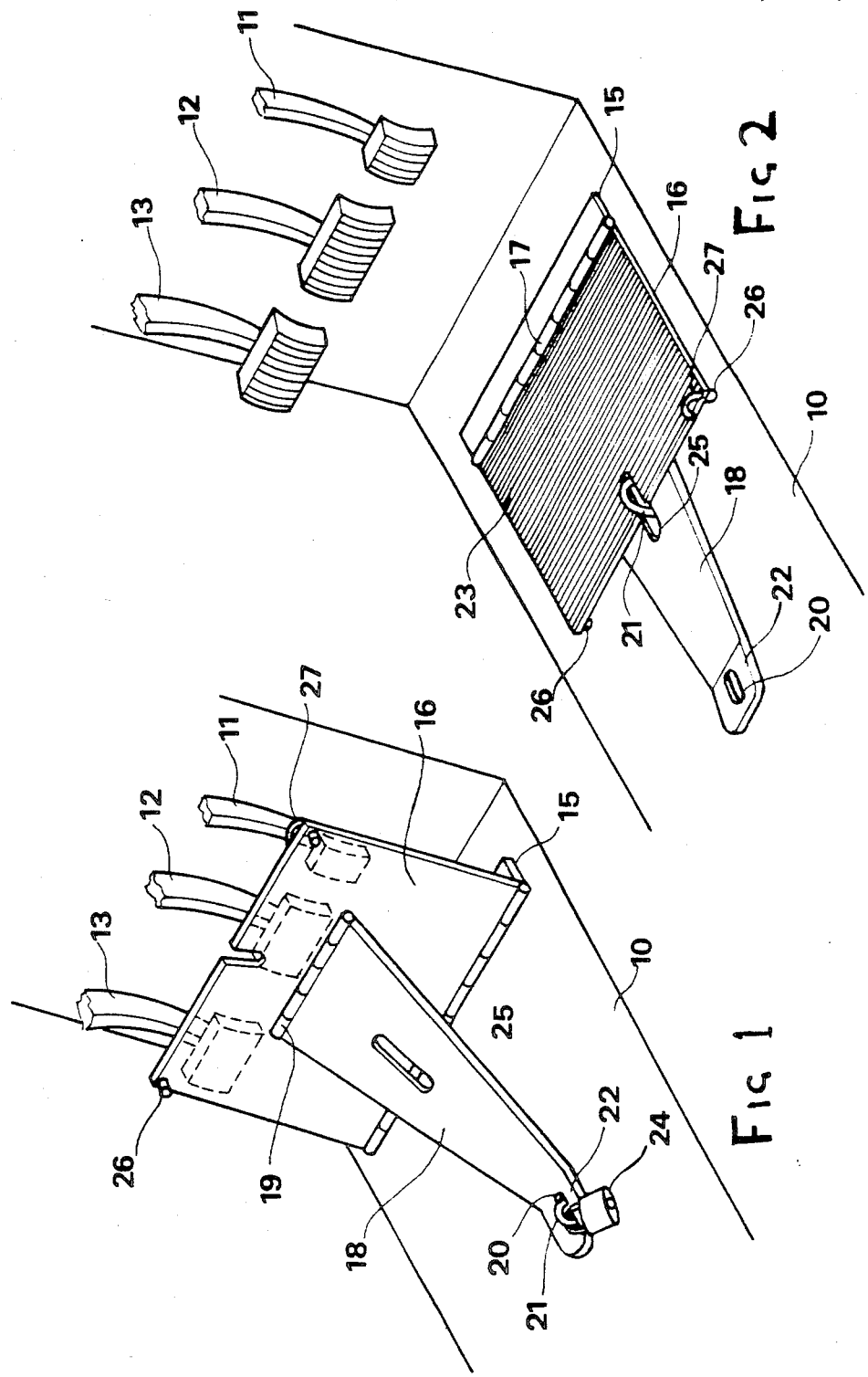

VEHICLE SECURITY DEVICE

This invention relates to vehicle security devices and, in particular, devices for preventing the use of vehicles by unauthorized persons.

According to the invention a vehicle security device comprises a covering member fixably in a vehicle adjacent the vehicle operating pedals and movable between an operative position preventing access to and operation of the pedals and an inoperative, stowed position, and a locking stay pivoted to the covering member and movable with the covering member between the operative and inoperative positions, the locking stay at a position towards its end remote from the covering member being lockable to the vehicle to secure the device in the operative position.

Preferably the covering member is fixable to the floor of the vehicle at a position below the pedals and, in the inoperative position, the covering member defines a foot rest.

Conveniently the covering member and the locking stay lie substantially parallel to one another and to the vehicle floor when in the inoperative position in a vehicle.

The locking stay may be fixed in the operative position by a padlock.

Preferably the locking stay is pivoted to the covering member at a position intermediate a pivot about which the covering member is movable between said positions and an edge of the covering member remote from said pivot and the covering member is fixable to the vehicle by a plate which is secured to the vehicle floor the plate being pivotally attached to the covering member.

Conveniently the locking stay extends rearwardly of the pedals and with respect to the covering member and terminates in front of vehicle seat mounting for the vehicle driver.

Further features of the invention will appear from the following description of an embodiment of the invention given by way of example only and with reference to the drawings, in which:

FIG. 1 is a perspective view of a security device in an operative position in a vehicle, FIG. 2 is a view corresponding to FIG. 1 with the device in an inoperative position.

Referring to the drawings a security device is shown fitted into a vehicle having a floor member 10 and the usual accelerator, clutch and brake pedals 11, 12, 13 movably mounted at the forward end of the driver's area. Spaced to the rear of the pedals 11, 12, 13, the driver's seat (not shown) is mounted on the member 10.

The security device includes a floor plate 15 secured directly to the floor member 10 by welding, by bolts or by any other convenient means which firmly anchors the plate 15 to the member 10. A covering plate 16 is pivoted at one end to the floor plate 15 by a hinge 17.

The covering plate 16 is also pivoted intermediate the hinge 17 and its other end to a stay member 18 by a hinge 19 so that the covering plate 16 and stay member 18 can be moved between the operative position of FIG. 1 and the inoperative position of FIG. 2.

In the operative position the stay member 18 is locked in place by a fixing member 21 mounted on the floor member 10 and extending upwards for location through a slot 20 formed in an extension piece 22 of the stay member 18. The extension piece 22 is angled relatively to the stay member 18. Once inserted through the slot 20 the fixing member 21 is engaged by a locking device 24, in this case a conventional padlock to secure the device in the operative position.

The upper surface of the covering plate 16 when inoperative supports the driver's feet and is covered with rubberized ribs 23.

The device is moved to an inoperative position by releasing the locking device 24 from the fixing member 21, lifting the extension piece off the member 21, and pivoting the covering plate 16 and the stay member 18, until they lie flush with the floor 10 as seen in FIG. 2. In practice the device will extend with the end of the stay member 18 adjacent the front of the mounting of the driver's seat in the inoperative position.

It will be seen that in the operative position of the device the pedals 11, 12 and 13 are inaccessible to drive the vehicle thereby securing the vehicle against unauthorized use.

It will also be seen that provision is made so that, in the inoperative position, the fixing member 21 projects through a slot 25 in the stay member 18 to allow the device to lie flush with the floor 10 and not obstruct normal usage of the vehicle. The covering plate 16 is provided with feet 26 to support it on the floor 10 and a handle 27 to lift it.

The stay member 18 may be replaced by bars pivotally attached at their ends to the covering plate 16 and securable to an apertured pin extending through an opening defined by the bars in the operative position. A locking device (not shown) is located through the aperture in the pin to lock the device in position.

What I claim as my invention and desire to secure by Letters Patent of the United States is:

1. A vehicle securing device which comprises a covering plate fixable in a vehicle adjacent the vehicle pedals and pivotable about a first pivot axis between an operative position preventing access to and operation of the pedals and an inoperative, stowed position; a locking stay having one end and an opposite end and pivotally attached at said one end to the covering plate about a second pivot axis parallel to and spaced from the first axis, the second pivot axis being located intermediate the first pivot axis and an edge of the covering plate remote from the first pivot axis; fixing means for the locking stay whereby said opposite end of the locking stay is fixed in relation to the vehicle floor in the operative position; and releasable locking means for locking the locking stay to the fixing means, the device in the inoperative position lying with the covering plate and the locking stay extending rearwards from the pedals and on the floor of the vehicle.

2. A device according to claim 1 wherein the covering plate is fixed in relation to the vehicle floor adjacent the pedals by a fixing plate which is fixed to the vehicle floor, the fixing plate being attached to the covering plate about said first axis.

3. A device according to claim 1 wherein the locking stay is apertured between said one and opposite ends to receive the fixing means when in said inoperative position.

4. A device according to claim 1 wherein the covering plate and locking stay are so dimensioned and the first and second pivots are so located that the device in its inoperative position terminates in front of the vehicle driver's seat mounting.

* * * * *